United States Patent
Bruna et al.

(10) Patent No.: US 6,839,467 B2
(45) Date of Patent: Jan. 4, 2005

(54) METHOD OF COMPRESSING DIGITAL IMAGES

(75) Inventors: Arcangelo Bruna, San Cataldo (IT); Massimo Mancuso, Monza (IT); Agostino Galluzzo, Palma Di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 583 days.

(21) Appl. No.: 09/903,371

(22) Filed: Jul. 10, 2001

(65) Prior Publication Data

US 2003/0063807 A1 Apr. 3, 2003

(30) Foreign Application Priority Data

Jul. 10, 2000 (EP) .............................. 00202438

(51) Int. Cl.[7] .................................. G06K 9/36
(52) U.S. Cl. ....................................... 382/239
(58) Field of Search ..................... 375/240.01, 240.04, 375/240.08; 382/232, 233, 234, 235, 236, 238, 239, 240, 241, 242, 243, 248, 250, 251; 348/384.1, 400.1, 401.1, 402.1, 409.1, 413.1, 415.1, 416.1

(56) References Cited

U.S. PATENT DOCUMENTS

| | | | | |
|---|---|---|---|---|
| 5,339,368 A | * | 8/1994 | Higgins-Luthman et al. .... | 382/169 |
| 5,764,814 A | * | 6/1998 | Chen et al. ................. | 382/243 |
| 5,818,529 A | | 10/1998 | Asamura et al. ............ | 348/396 |
| 5,995,670 A | * | 11/1999 | Zabinsky ..................... | 382/242 |
| 6,037,988 A | * | 3/2000 | Gu et al. ............... | 375/240.16 |
| 6,452,970 B1 | * | 9/2002 | Kaup ...................... | 375/240.1 |
| 6,512,791 B1 | * | 1/2003 | Takayama .............. | 375/240.01 |
| 6,760,479 B1 | * | 7/2004 | Feria .......................... | 382/238 |

FOREIGN PATENT DOCUMENTS

| | | |
|---|---|---|
| EP | 0 566 219 A2 | 10/1993 |
| EP | 0 899 961 A1 | 3/1999 |
| WO | WO 95/04434 | 2/1995 |
| WO | WO 99/60793 | 11/1999 |

OTHER PUBLICATIONS

Martinez–Uriegas, E.et al., "Spatiochromatic Multiplexing: A Color Image Representation for Digital Processing and Compression," *SPIE*, vol. 2657, pp. 412–420, 1996.

Marcellin, M.W. et al., "Transform Coding of Monochrome and Color Images Using Trellis Coded Quantization," *IEEE Trans. on Circuits and Systems for Video Tech.*, 3(4):270–276, Aug. 1993.

Balasubramanian, R. et al., "Sequential Scalar Quantization for Color Images," *Journal of Electronic Imaging*, 3(1):45–59, Jan. 1994.

* cited by examiner

*Primary Examiner*—Jose L. Couso
(74) *Attorney, Agent, or Firm*—Lisa K. Jorgenson; Robert Iannucci; Seed IP Law Group PLLC (57) ABSTRACT

A method compresses a digital image including a matrix of elements each one including a plurality of digital components of different type representing a pixel. The method includes the steps of providing an incomplete digital image wherein at least one component is missing in each element, obtaining the digital image from the incomplete digital image, splitting the digital image into a plurality of blocks and calculating, for each block, a group of DCT coefficients for the components of each type, and quantizing the DCT coefficients of each group using a corresponding quantization table scaled by a gain factor for achieving a target compression factor. The method further comprises the steps of determining an energy measure of the incomplete digital image and estimating the gain factor as a function of the energy measure, the function being determined experimentally according to the target compression factor.

17 Claims, 6 Drawing Sheets

METHOD OF COMPRESSING DIGITAL IMAGES

BACKGROUND OF THE INVENTION

1. Field of the Invention

The present invention relates to a method of compressing digital images.

2. Description of the Related Art

Digital images are commonly used in several applications such as, for example, in digital still cameras (DSC). A digital image consists of a matrix of elements, commonly referred to as a bit map; each element of the matrix, which represents an elemental area of the image (a pixel or pel), is formed by several digital values indicating corresponding components of the pixel.

Digital images are typically subjected to a compression process in order to increase the number of digital images which can be stored simultaneously, such as onto a memory of the camera; moreover, this allows transmission of digital images (for example in the INTERNET) to be easier and less time consuming. A compression method commonly used in standard applications is the JPEG (Joint Photographic Experts Group) algorithm, described in CCITT T.81, 1992.

In the JPEG algorithm, 8×8 pixel blocks are extracted from the digital image; Discrete Cosine Transform (DCT) coefficients are then calculated for the components of each block. The DCT coefficients are rounded off using corresponding quantization tables; the quantized DCT coefficients are encoded in order to obtain a compressed digital image (from which the corresponding original digital image can be extracted later on by a decompression process).

In some applications, it is necessary to provide a substantially constant memory requirement for each compressed digital image (the so called Compression Factor Control, or CF-CTRL). This problem is particularly perceived in digital still cameras; in fact, in this case it must be ensured that a minimum number of compressed digital images can be stored onto the memory of the camera, in order to guarantee that a minimum number of photos can be taken by the camera.

The compression factor control is quite difficult in algorithms, such as the JPEG, wherein the size of the compressed digital image depends on the content of the corresponding original digital image.

Generally, the compression factor is controlled by scaling the quantization tables using a multiplier coefficient (gain factor). The gain factor to obtain a target compression factor is determined using iterative methods. The compression process is executed several times, at least twice; the gain factor is modified according to the result of the preceding compression process, until the compressed digital image has a size that meets the target compression factor.

The methods known in the art require a high computation time, so that they are quite slow. Moreover, the known methods involve a considerable power consumption; this drawback is particular acute when the compression method is implemented in a digital still camera, or other portable devices which are supplied by batteries.

SUMMARY OF THE INVENTION

An embodiment of the present invention overcomes the above mentioned drawbacks using a method of compressing a digital image.

Briefly, the method of compressing a digital image includes a matrix of elements each one consisting of a plurality of digital components of different type representing a pixel. The method includes providing an incomplete digital image wherein at least one component is missing in each element, obtaining the digital image from the incomplete digital image, splitting the digital image into a plurality of blocks and calculating, for each block, a group of DCT coefficients for the components of each type, and quantizing the DCT coefficients of each group using a corresponding quantization table scaled by a gain factor for achieving a target compression factor. The method further comprises the steps of determining at least one energy measure of the incomplete digital image and estimating the gain factor as a function of the at least one energy measure, the function being determined experimentally according to the target compression factor.

Moreover, the present invention also provides a corresponding device for compressing a digital image and a digital still camera comprising this device.

BRIEF DESCRIPTION OF THE DRAWINGS

Further features and the advantages of the solution according to the present invention will be made clear by the following description of a preferred embodiment thereof, given purely by way of a non-restrictive indication, with reference to the attached figures, in which.

DETAILED DESCRIPTION OF THE INVENTION

Figure 1:
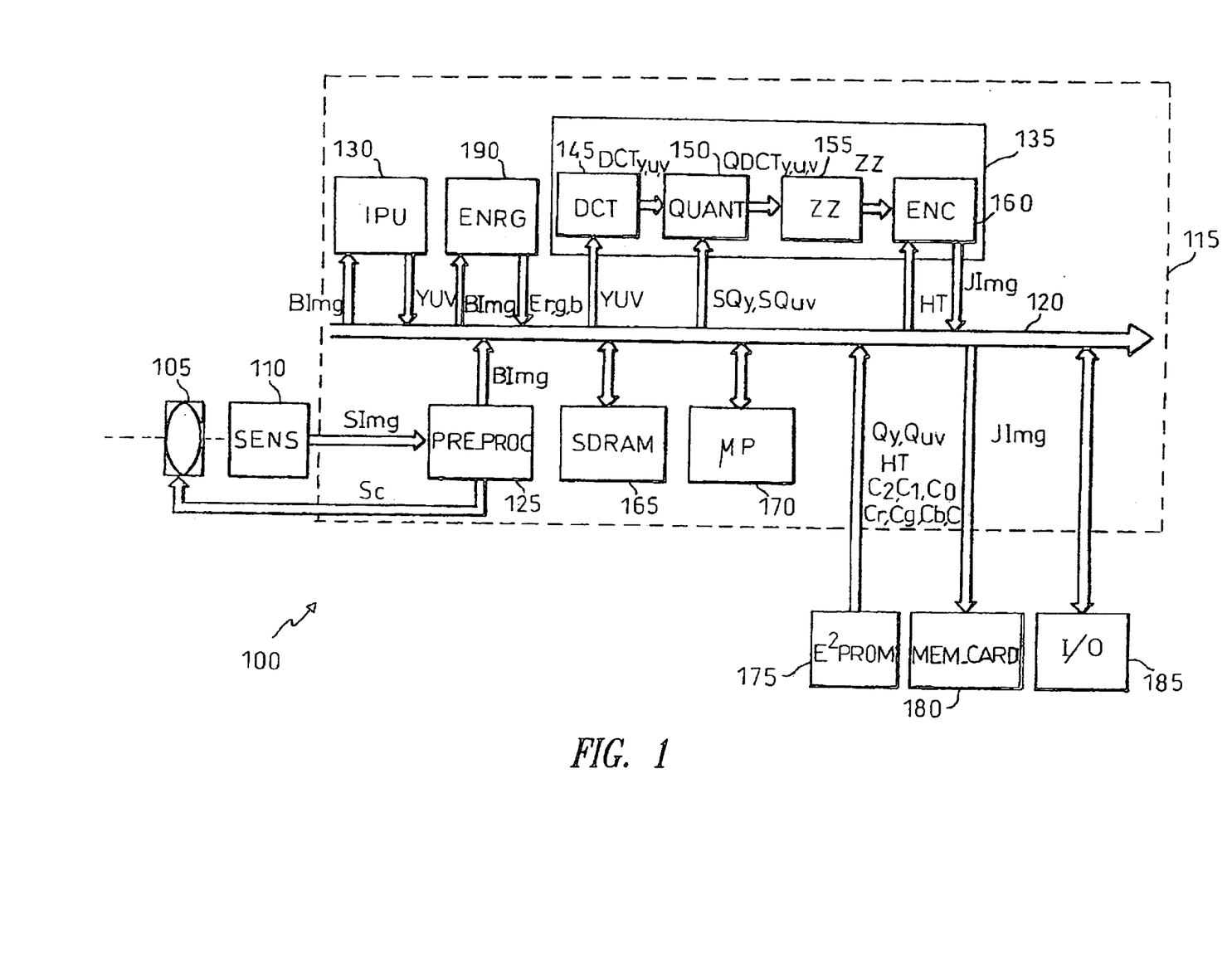
FIG. 1 is a schematic block diagram of a digital still camera, in which the compression method of the invention can be used.

With reference in particular to FIG. 1, this shows a digital still camera 100 for taking digital images representative of real scenes. A digital image is constituted by a matrix with N rows and M columns (for example, 640 rows by 480 columns); each element of the matrix consists of several digital values (for example three values each one of 8 bits, ranging from 0 to 255) representative of respective optical components of a pixel.

The camera 100 includes an image-acquisition unit 105 formed by a diaphragm and a set of lenses for transmitting the light corresponding to the image of the real scene onto a sensor unit (SENS) 110. The sensor unit 110 is typically constituted by a Charge-Coupled Device (CCD); a CCD is an integrated circuit which contains a matrix of light-sensitive cells, each one generating a voltage the intensity of which is proportional to the exposure of the light-sensitive cell. The voltage generated by each light-sensitive cell is supplied to an analog/digital converter, which produces a corresponding digital value.

In order to reduce the number of light-sensitive cells, the sensor unit 110 does not detect all the components for every pixel; typically, only one light-sensitive cell is provided for each pixel. The CCD is covered by a color filter consisting of a matrix of filter elements each one associated with a corresponding light-sensitive cell of the CCD; each filter element transmits (absorbing a minimal portion) the luminous radiation belonging only to the wavelength of red, blue or green light (substantially absorbing the others), so as to detect a red color component (R), a green color component (G), or a blue color component (B) for each pixel.

In particular, the filter is of the Bayer type as described in U.S. Pat. No. 3,971,065, in which only the G component is detected for a half of the pixels, in a chessboard-like arrangement; the R component or the B component is detected for the other half of the pixels, in respective alternate rows, as shown in the following table:

| ... | ... | ... | ... | ... | ... | ... | ... | ... | ... | ... |
|-----|-----|-----|-----|-----|-----|-----|-----|-----|-----|-----|
| ... | G   | R   | G   | R   | G   | R   | G   | R   | G   | ... |
| ... | B   | G   | B   | G   | B   | G   | B   | G   | B   | ... |
| ... | G   | R   | G   | R   | G   | R   | G   | R   | G   | ... |
| ... | B   | G   | B   | G   | B   | G   | B   | G   | B   | ... |
| ... | ... | ... | ... | ... | ... | ... | ... | ... | ... | ... |

An incomplete digital image SImg, in which each element consists of a single color component (R, G or B), is output by the sensor unit 110.

The camera 100 includes a control unit 115 formed by several blocks which are connected in parallel to a communication bus 120. Particularly, a pre-processing unit (PRE_PROC) 125 receives the incomplete digital image SImg. The pre-processing unit 125 determines various parameters of the incomplete digital image SImg (such as a high-frequency content and an average luminosity); these parameters are used to automatically control a focus (auto-focus) and an exposure (auto-exposure) by means of corresponding control signals Sc which are supplied to the acquisition unit 105. The pre-processing unit 125 also modifies the incomplete digital image SImg, for example applying a white-balance algorithm which corrects the color shift of the light towards red (reddish) or towards blue (bluish), in dependence on the color temperature of the light source; a corresponding incomplete digital image BImg is output by the pre-processing unit 125 and sent onto the bus 120.

The incomplete digital image BImg is received by an image-processing unit (IPU) 130. The image-processing unit 130 interpolates the missing color components in each element of the incomplete digital image BImg, in order to obtain a corresponding digital image RGB wherein each pixel is represented by the R component, the G component and the B component. The digital image RGB is then processed to improve image quality, for example correcting exposure problems such as back-lighting or excessive front illumination, reducing a noise introduced by the CDD, correcting alterations of a selected color tone, applying special effects (such as a mist effect), compensating the loss of sharpness due to a γ-correction function (typically applied by a television set); moreover, the digital image can be enlarged, a particular of the image can be zoomed, or the ratio of its dimensions can be changed (for example from 4:3 to 16:9), and the like.

The digital image RGB is then converted into a corresponding digital image YUV in a luminance/chrominance space. Each pixel of the digital image YUV is represented by a luminance component Y (providing information about the brightness), and two chrominance components Cu and CV (providing information about the hue); the Y,Cu,Cv components are calculated from the respective R,G,B components applying, for example, the following equations:

$Y=0.299 \cdot R+0.587 \cdot G+0.114 \cdot B$ $Cu=-0.1687 \cdot R-0.3313 \cdot G+0.5 \cdot B+128$ $Cv=0.5 \cdot R-0.4187 \cdot G-0.0813 \cdot B+128$ This allows chrominance information to be easily identified, in order to discard more chrominance information that luminance information during a following compression process of the digital image (the human eye being more sensitive to luminance than chrominance). The digital image YUV is sent onto the bus 120.

A compression unit 135 is also connected to the bus 120; the compression unit 135 receives the digital image YUV and outputs a corresponding digital image JImg compressed applying a JPEG algorithm. The compression unit 135 includes a Discrete Cosine Transform (DCT) unit 145, which is input the digital image YUV. Each component of the digital image YUV is shifted from the range 0 . . . 255 to the range −128 . . . +127, in order to normalize the result of the operation. The digital image YUV is then split into several blocks of 8×8 pixels (640×480/64=4800 blocks in the example at issue). Each block of Y components BLy, each block of Cu components BLu, and each block of Cv components BLv is translated into a group of DCT coefficients DCTy, a group of DCT coefficients DCTu, and a group of DCT coefficients DCTv, respectively, representing a spatial frequency of the corresponding components. The DCT coefficients DCTy,u,v[h,k] (with h,k=(0) . . . 7) are calculated using the following formula:

$$DCT_{y,u,v[h,k]} = \frac{1}{4} DhDk \sum_{x=0}^{7} \sum_{y=0}^{7} BLy, u, v[x, y] \cos\frac{(2h+1)x\pi}{16} \cos\frac{(2k+1)y\pi}{16}$$

wherein Dh,Dk=$1/\sqrt{2}$ for h,k=0 and Dh,Dk=1 otherwise. The first DCT coefficient of each group is referred to as DC coefficient, and it is proportional to the average of the components of the group, whereas the other DCT coefficients are referred to as AC coefficients.

The groups of DCT coefficients DCTy,u,v are directly provided to a quantizer (QUANT) 150, which also receives (from the bus 120) a scaled quantization table for each type of component; typically, a scaled quantization table SQy is used for the Y components and a scaled quantization table SQuv is used for both the Cu components and the Cv components. Each scaled quantization table consists of a 8×8 matrix of quantization constants; the DCT coefficients of each group are divided by the corresponding quantization constants and rounded off to the nearest integer. As a consequence, smaller and unimportant DCT coefficients disappear and larger DCT coefficients lose unnecessary precision. The quantization process generates corresponding groups of quantized DCT coefficients QDCTy for the Y component, groups of quantized DCT coefficients QDCTu for the Cu component, and groups of quantized DCT coefficients QDCTv for the Cv component.

These values drastically reduce the amount of information required to represent the digital image. The JPEG algorithm is then a lossy compression method, wherein some information about the original image is finally lost during the compression process; however, no image degradation is usually visible to the human eye at normal magnification in the corresponding de-compressed digital image for a compression ratio ranging from 10:1 to 20:1 (defined as the ratio between the number of bits required to represent the digital image YUV and the number of bits required to represent the compressed digital image JImg).

Each scaled quantization table SQy,SQuv is obtained multiplying a corresponding quantization table Qy,Quv by a gain factor G (determined as set out in the following), that is Sqy=G·Qy and Squv=G·Quv. The gain factor G is used to obtain a desired, target compression factor bpt of the JPEG algorithm (defined as the ratio between the number of bits of the compressed digital image JImg and the number of pixels). Particularly, if the gain factor G is greater than 1, the compression factor is reduced (compared to the one provided by the quantization tables Qy,Quv), whereas if the gain factor G is less than 1 the compression factor is increased.

The quantization tables Qy,Quv are defined so as to discard more chrominance information that luminance information. For example, the quantization table Qy is:

| 1  | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 8   | 62  |
| 18 | 22 | 37 | 56 | 68  | 109 | 203 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  | and the quantization table Quv is:

| 1  | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |

Preferably, the quantization constants for the DC coefficients are equal to 1 in both cases, in order not to lose any information about the mean content of each block, and then to avoid the so-called "block-effect" (wherein a contrast is perceivable between the blocks of the de-compressed image).

The groups of quantized DCT coefficients QDCTy,u,v are directly provided to a zigzag unit (ZZ) 155. The zigzag unit 155 modifies and reorders the quantized DCT coefficients to obtain a single vector ZZ of digital values. Each quantized DC coefficient (but the one of a first group) is represented as the difference from the quantized DC coefficient of a previous group. The quantized AC coefficients are arranged in a zigzag order, so that quantized AC coefficients representing low frequencies are moved to the beginning of the group and quantized AC coefficients representing high frequencies are moved to the end of the group; since the quantized AC coefficients representing high frequencies are more likely to be zeros, this increases the probability of having longer sequences of zeros in the vector ZZ (which require a lower number of bits in a run length encoding scheme).

The vector ZZ is directly provided to an encoder (ENC) 160, which also receives one or more encoding tables HT from the bus 120. Each value of the vector ZZ is encoded using a Huffinan scheme, wherein the value is represented by a variable number of bits which is inversely proportional to a statistical frequency of use thereof. The encoder 160 then generates the corresponding compressed digital image JImg (which is sent onto the bus 120). The compressed digital image JImg is typically formed by a header (for example some tens of bytes containing information about the digital image and the compression method, such as the quantization tables and the dimension of the digital image) followed by the encoded values. If the last encoded value associated with a block is equal to 00, it must be followed by a (variable) End of Block (EOB) control word. Moreover, if an encoded value is equal to a further control word FF (used as a marker), this value must be followed by a 00 value.

The control unit 115 also includes a working memory 165, typically an SDRAM (Synchronous Dynamic Random Access Memory) and a microprocessor ($\mu$P) 170, which controls the operation of the device. Several peripheral units are further connected to the bus 120 (by means of a respective interface). Particularly, a non-volatile memory 175, typically a flash E2PROM, stores the quantization tables Qy,Quv, the encoding tables HT, and a control program for the microprocessor 170. A memory card (MEM_CARD) 180 is used to store the compressed digital images JImg; the memory card 185 has a capacity of a few Mbytes, and can store several tens of compressed digital images JImg. At the end, the camera 100 includes an input/output (I/O) unit 185 consisting, for example, of a series of push-buttons, for enabling the user to select various functions of the camera 100 (such as an on/off button, an image quality selection button, a shot button, a zoom control button), and a liquid-crystal display (LCD), for supplying data on the operative state of the camera 100 to the user.

Likewise considerations apply if the camera has a different architecture or includes different units, such as equivalent communication means, a CMOS sensor, a view-finder or an interface for connection to a personal computer (PC) and a television set, if another color filter (not with a Bayer pattern) is used, if the compressed digital images are directly sent outside the camera (without being stored onto the memory card), and so on. Alternatively, the digital image is converted into another space (not a luminance/chrominance space), the digital image RGB is directly compressed (without being converted), the digital image YUV is manipulated to down-sample the Cu,Cv components by averaging groups of pixels together (in order to eliminate further information without sacrificing overall image quality), or no elaboration of the digital image is performed; similarly, one or more different quantization tables are used, arithmetic encoding schemes are employed, a different compression algorithm is used (such as a progressive JPEG). Moreover, the compression method of the present invention leads itself to be implemented even in a different apparatus, such as a portable scanner, a computer in which graphic applications are provided, and the like.

In the camera 100, in addition to the known structure described above, it is provided an energy unit (ENRG) 190 which receives the incomplete digital image BImg from the bus 120. The energy unit 190 determines (as described in detail in the following) an energy measure Er, Eg and Eb for each type of color component (R, G and B, respectively) of the incomplete digital image BImg; in other words, values indicative of the high-frequency content of each type of color component of the incomplete digital image BImg are determined. The energy measures Er,Eg,Eb are then sent onto the bus 120.

The inventors have discovered that the gain factor G for obtaining the target compression factor bpt is a function of one or more energy measures of the incomplete digital image BImg (the energy measures Er, Eg and Eb in the example at issue). The function depends on the target compression factor bpt (in addition to the characteristics of the camera 100, such as the dimension of the CCD, the size of the digital image, the quantization tables used), and can be determined a priori by a statistical analysis.

More generally, as described in detail in the following, an embodiment of the present invention includes the steps of determining at least one energy measure of the incomplete digital image and estimating the gain factor as a function of the at least one energy measure, the function being determined experimentally according to the target compression factor.

The method is very fast, in that the operations performed by the processing unit and by the compression unit (i.e., the modification of the incomplete digital image and the compression of the digital image) are executed only once.

The solution is particularly advantageous in portable devices supplied by batteries (even if different applications are not excluded), since it drastically reduces the power consumption.

These results are achieved with a low error (of the order of a few units per cent) between the target compression factor bpt and a compression factor bpa actually obtained, defined as (bpt-bpa)/bpt. Experimental results on the camera at issue provided a mean error of −0.6% (the negative error is more important than the positive error because the size of the compressed digital image is bigger than the target one), with a distribution of 68% between ±6% and 82% between ±10%.

In a preferred embodiment of the present invention, it is first estimated, as a function of the one or more energy measures, a basic compression factor bpb obtained using the quantization tables Qy,Quv scaled by a pre-set factor S (determined as set out in the following). The gain factor G for obtaining the target compression factor bpt is then estimated as a function of the basic compression factor bpb. Both functions are determined a priori by a statistical analysis.

Figure 2A:
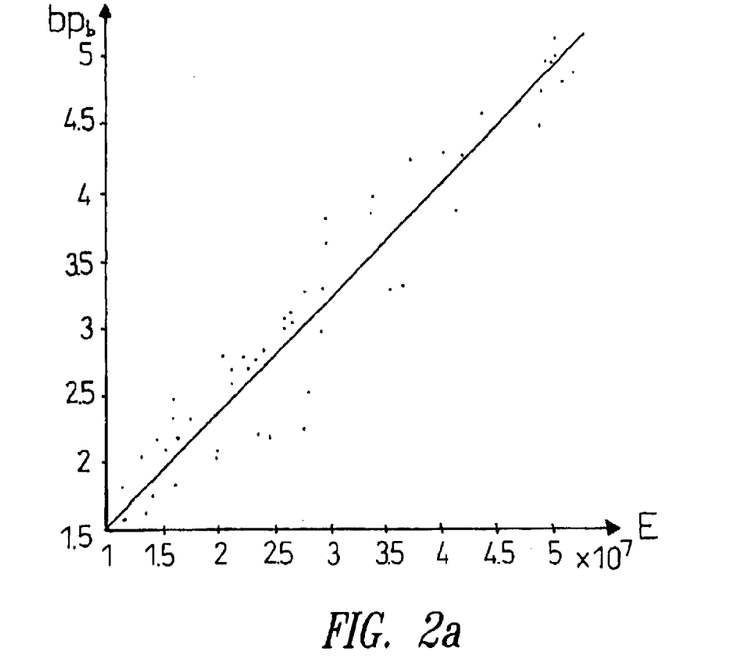
FIGS. 2a and 2b depict an example of relation energy/basic compression factor and an example of relation basic compression factor/gain factor, respectively.

For example, FIG. 2a shows a relation between a total energy measure E=Er+Eg+Eb and the basic compression factor bpb for a camera having a CDD with 1 million of light-sensitive cells and for images of 640×480 pixels, with a factor S=0.2 and a target compression factor bpt=2 bit/pel. This relation can be interpolated as a linear function; in other words, the basic compression factor bpb can be estimated using the relation bpb=Cr·Er+Cg·Eg+Cb·Eb+C (wherein Cr, Cg, Cb and C are parameters depending on the characteristics of the camera 100 and the target compression factor bpt).

Figure 2B:
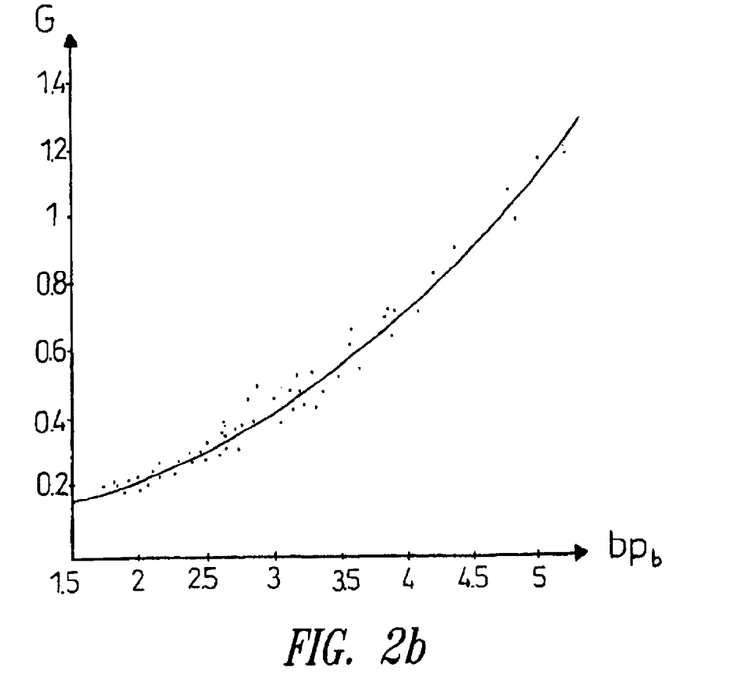

On the other hand, FIG. 2b shows an example of a relation between the basic compression factor bpb and the gain factor G for obtaining a compression factor of 2 bit/pel (for the same camera as above). This relation can be interpolated as a quadratic function; in other words, the gain factor G can be estimated using the relation $G = C_2 \cdot bp_b^2 + C_1 \cdot bp_b + C_0$ (wherein C2, C2 and C0 are parameters depending on the characteristics of the camera 100 and the target compression factor bpt).

This solution is particular simple and provides a good accuracy.

The parameters Cr,Cg,Cb,C are stored onto the E2PROM 175. Preferably, two or more sets of parameters C2,C1,C0, each one associated with a different value of the target compression factor bpt and with a different size of the digital image, are determined a priori by a statistical analysis. A look-up table, wherein each row addressable by the value of the target compression factor bpt contains the respective parameters C2,C1,C0, is also stored onto the E2PROM 175. This feature allows different compression factors to be easily selected by the user.

Advantageously, the factor S is determined a priori by a statistical analysis, in order to further reduce the error between the target compression factor bpt and the actual compression factor bpa. Experimental results have shown that the factor S which minimizes the error also depends on the target compression factor bpt (in addition to the characteristics of the camera 100).

Alternatively, the gain factor is estimated directly from the energy measures, the relation bpb/E and the relation G/bpb are interpolated with different functions (such as a logarithmic function), the look-up table is stored elsewhere or a different memory structure is used, only one set of parameters C2,C1,C0 is stored, the linear and quadratic functions are implemented by software, the factor S is set to a constant value, even equal to 1 (irrespective of the target compression factor bpt), and the like.

Figure 3:
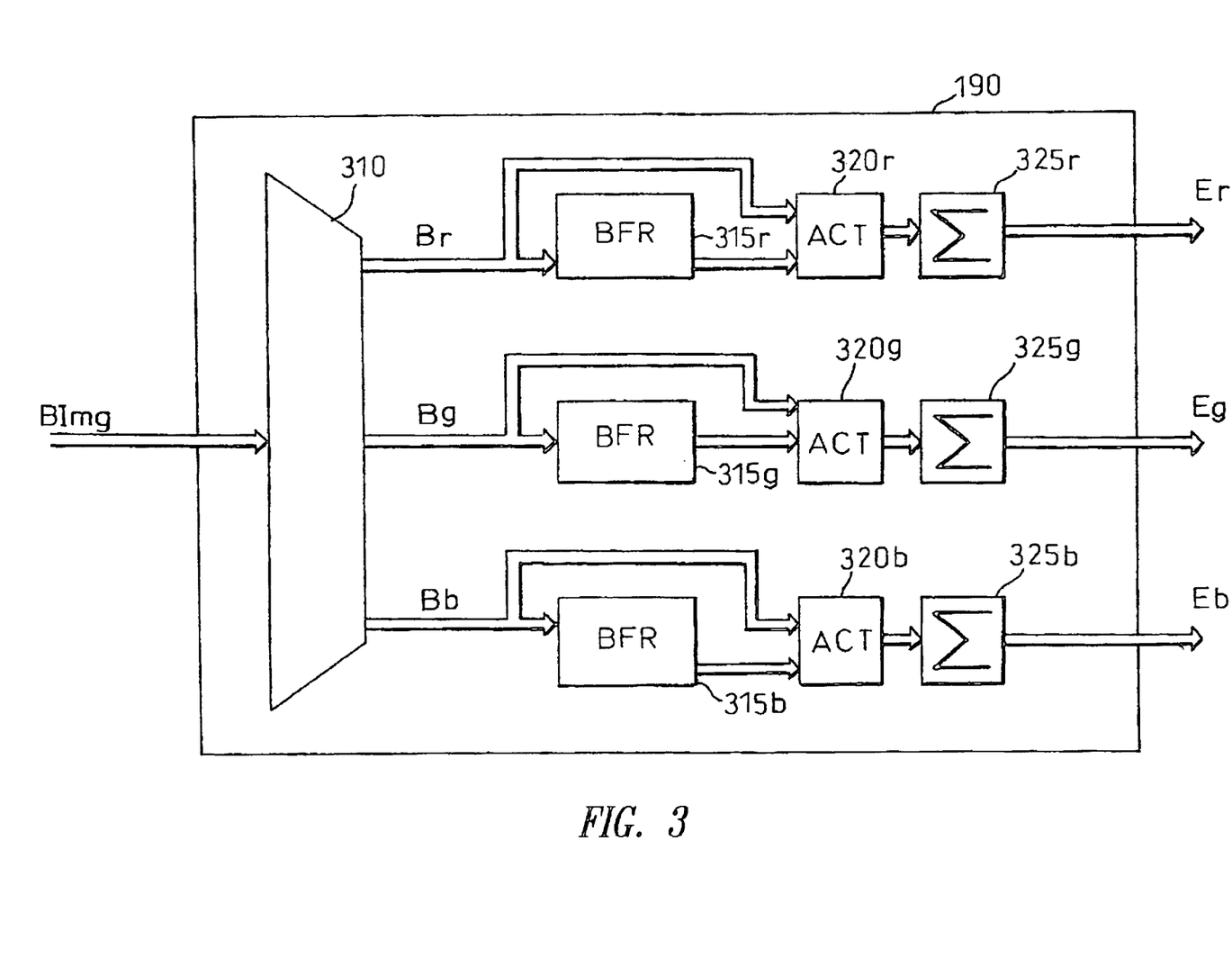
FIG. 3 is a schematic block diagram of an energy unit of the camera.

Considering now FIG. 3, the energy unit 190 includes a demultiplexer 310 with one input and three outputs; the demultiplexer 310 receives the incomplete digital image BImg and transfers the color components of each type to a respective output (according to a selection command not shown in the figure); as a consequence, the incomplete digital image BImg is split into a red color component image Br, a green color component image Bg, and a blue color component image Bb.

The color component images Br, Bg and Bb are supplied to a buffer (BFR) 315r, 315g, and 315b, respectively. An activity unit (ACT) 320r, 320g and 320b is also provided for each type of color component; the activity unit 320r,320g, 320b receives the color component image Br,Bg,Bb directly from the demultiplexer 310 and the color component image Br,Bg,Bb output by the buffer 315r,315g,315b at respective inputs. An output of each activity unit 320r, 320g and 320b is provided to a respective accumulator 325r, 325g and 325b, which outputs the corresponding energy measure Er, Eg and Eb.

Each buffer 315r,315g,315b compacts the color component image Br,Bg,Bb (scanning the matrix along each row), in order to remove the elements without the color component of the respective type. The activity unit 320r,320g,320b calculates, for each element of the compacted image, a value indicating an activity of the color components; the accumulator 325r,325g,325b then sums these values and set the respective energy measure Er,Eg,Eb equal to this sum, in other words:

wherein the parameter α is used to compensate for the asymmetry of the quantization table Qy along a horizontal and a vertical direction (for example α=0,6)

$$Eb = \sum_{i=0}^{N/2-1} \sum_{j=0}^{M/2-1} \alpha |Bb[i,j] - Bb[i+1,j]| + |Bb[i,j] - Bb[i,j+1]|$$

$$Er = \sum_{i=0}^{N/2-1} \sum_{j=0}^{M/2-1} \alpha |Br[i,j] - Br[i+1,j]| + |Br[i,j] - Br[i,j+1]|$$

$$Eg = \sum_{i=0}^{N-1} \sum_{j=0}^{M/2-1} \alpha |Bg[i,j] - Bg[i+1,j]| + |Bg[i,j] - Bg[i,j+1]|$$

This solution provides a good accuracy, without requiring a too heavy computing time. However, the solution of the present invention can also be implemented without any compensation parameter, using a different method for estimating the energy measures, such as Sobel filters, Laplacian filters (or other high-pass filters), using a single energy measure for all the components of the image (such as the total energy measure E=Er+Eg+Eb), and the like.

Alternatively, the energy unit is simplified by using a single output of the demultiplexer 310, for the green color component image Bg, and providing only the corresponding buffer 315g, activity unit 320g and accumulator 325g. In other words, the energy unit calculates only the energy measure Eg; the basic compression factor bpb is then estimated using the simplified formula bpb=Cg·Eg+C. This solution makes the energy unit more compact and fast, with the drawback of a low degradation of the precision of the method.

Figure 4A:
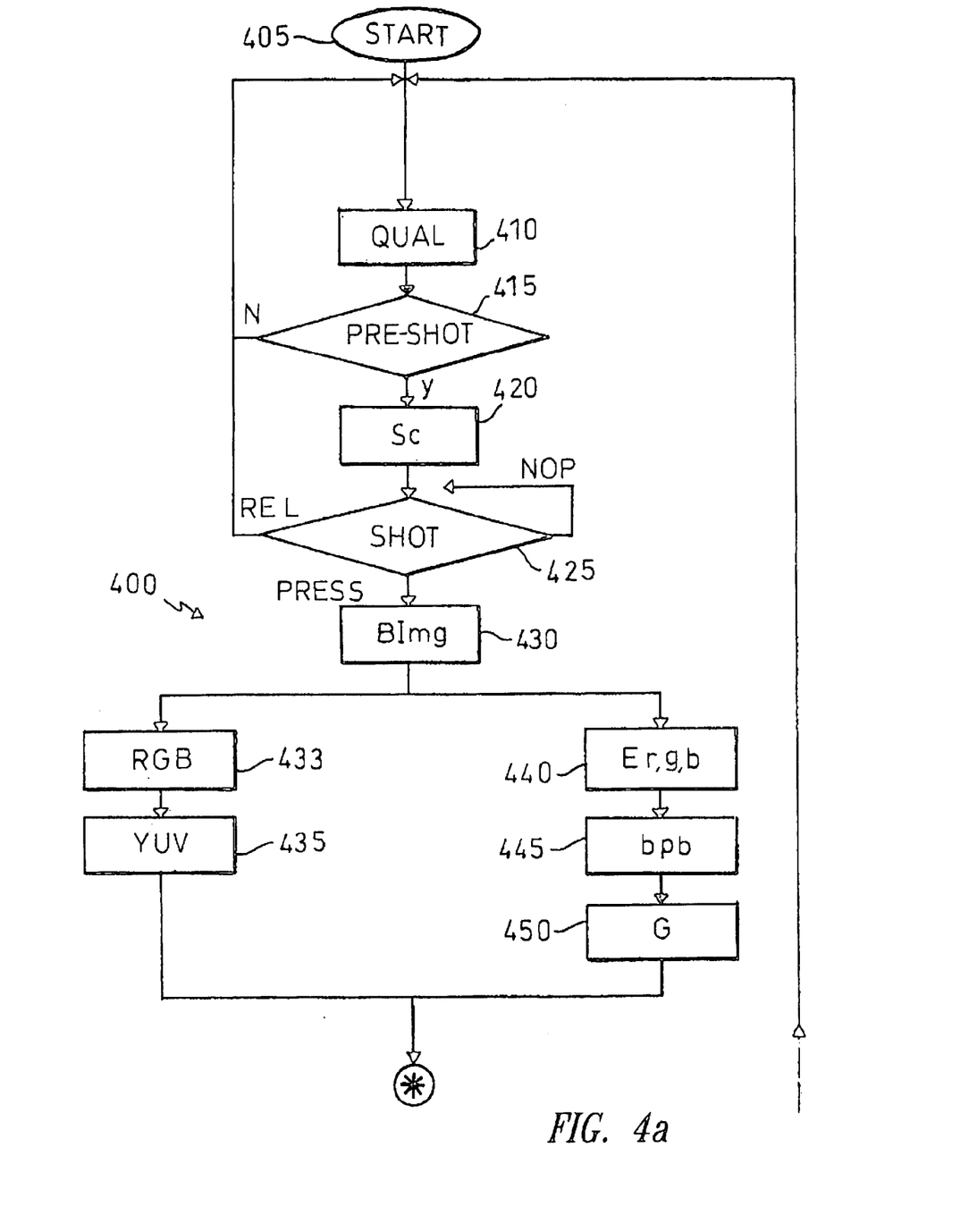
FIGS. 4a–4b show a flow chart of the compression method.
Figure 4B:
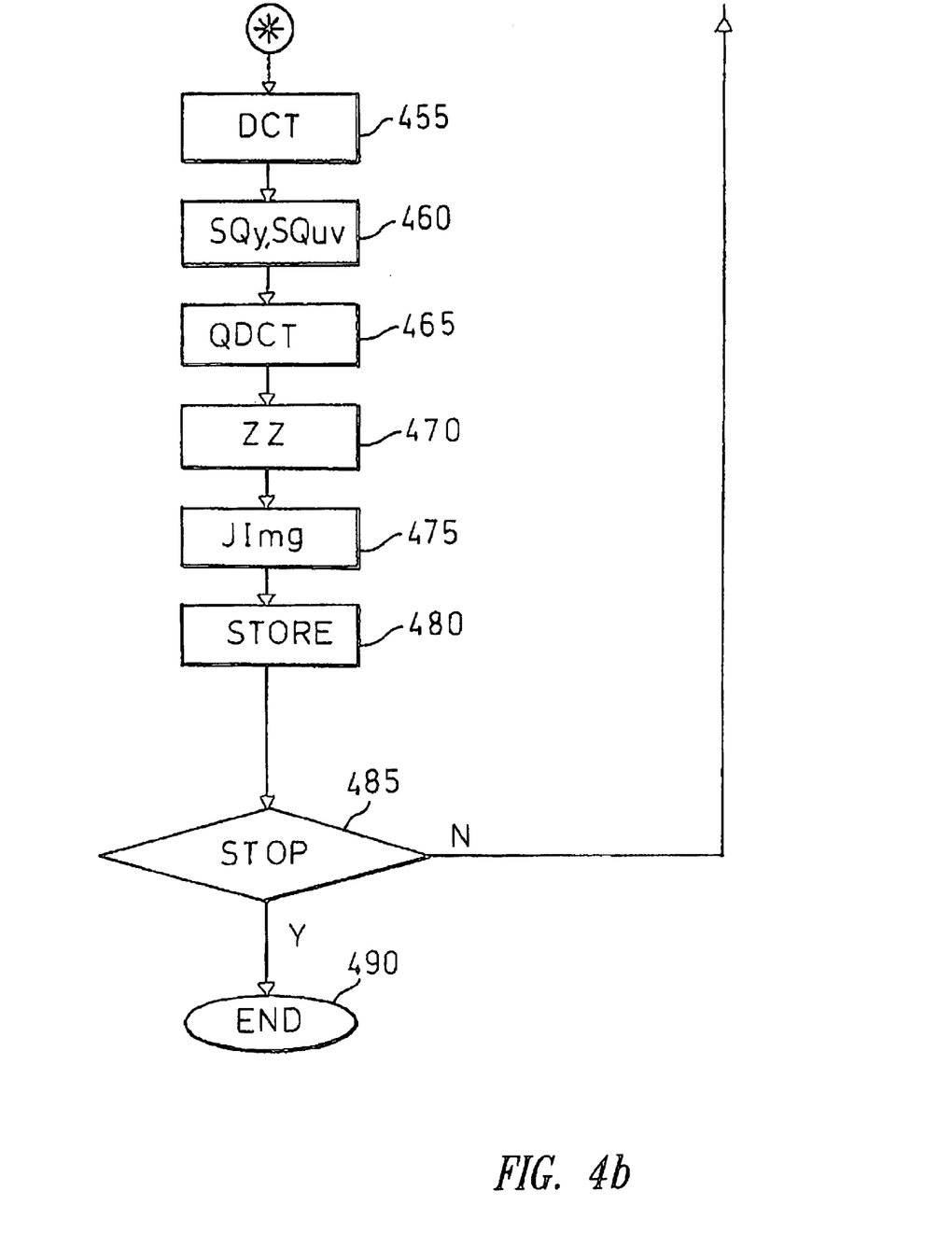

In order to explain the operation of the camera, reference is made to FIGS. 4a–4b (together with FIG. 1). When the camera 100 is switched on by the user (acting on the on/off button), the microprocessor 170 runs the control program stored in the E2PROM 175. A method 400 corresponding to this control program starts at block 405 and then passes to block 410, wherein the user selects the desired quality of the image (such as low or high) by acting on the corresponding button; the microprocessor 170 determines and stores onto the SDARM 165 the target compression factor bpt corresponding to the selected image quality (for example, 1 bit/pel for the low quality and 2 bit/pel for the high quality).

The method checks at block 415 if the shot button has been partially pressed in order to focus the image; if not, the method returns to block 410; as soon as the user partially presses the shot button, the method proceeds to block 420, wherein the incomplete digital image SImg is acquired by the sensor unit 110 (the diaphragm is always open and the light is focused by the lenses, through the Bayer filter, onto the CCD). The pre-processing unit 125 then controls the acquisition unit 115 (by means of the control signals Sc) according to the content of the incomplete digital image SImg.

The method checks again the status of the shot button at block 425. If the shot button has been released, the method returns to block 410, whereas if the shot button has been completely pressed (in order to take a photo) the method continues to block 430; on the other hand, if no action is performed by the user, the method stays in block 425 in an idle loop.

Considering now block 430, the incomplete digital image SImg is acquired by the sensor unit 110 and modified by the pre-processing unit 125; the corresponding incomplete digital image BImg is stored onto the SDRAM 165. The method then forks into two branches which are executed concurrently. A first branch consists of blocks 433–435, and a second branch consists of blocks 440–450; the two branches joint at block 455 (described in the following).

Considering now block 433, the incomplete digital image BImg is read from the SDRAM 165 and provided to the image-processing unit 130. The image-processing unit 130 interpolates the missing color components in each element of the incomplete digital image BImg, in order to obtain the corresponding digital image RGB, and modifies the digital image RGB to improve the image quality. The method passes to block 435, wherein the digital image RGB is converted into the corresponding digital image YUV.

At the same time, the incomplete digital image BImg (read from the SDRAM 165) is also provided to the energy unit 190 at block 440; the energy unit 190 calculates the energy measures Er, Eg and Eb. The method proceeds to block 445, wherein the microprocessor 170 receives the energy measures Er,g,b and estimates the basic compression factor bpb using the parameters Cr,Cg,Cb,C read from the E2PROM 175. Continuing now to block 450, the microprocessor reads the parameters C2,C1,C0 associated with the target compression factor bpt from the E2PROM 175 (addressing the look-up table by the value of the target compression factor bpt); the microprocessor 170 then estimates the gain factor G for obtaining the target compression factor bpt using the read parameters C2,C1,C0.

Considering now block 455, the digital image YUV is provided to the DCT unit 140 which calculates the groups of DCT coefficients DCTy,u,v. Proceeding to block 460, the microprocessor 170 reads the quantization tables Qy,Quv from the E2PROM 175 and calculates the scaled quantization tables SQy,SQuv multiplying the respective quantization tables Qy,Quv by the gain factor G. Continuing to block 465, the groups of DCT coefficients DCTy,u,v and the scaled quantization tables SQy,SQuv are provided to the quantizer 150, which generates the corresponding groups of quantized DCT coefficients QDCTy,u,v. The method proceeds to block 470, wherein the quantized DCT coefficients QDCTy,u,v are transformed into the vector ZZ by the zigzag unit 155. The vector ZZ is provided to the encoder 160 at block 475, which generates the corresponding compressed digital image JImg; the compressed digital image JImg is then stored onto the SDRAM 165. Continuing to block 480, the compressed digital image JImg is read from the SDRAM 165 and sent to the memory card 180.

The method then checks at block 485 if a stop condition has occurred, for example if the user has switched off the camera 100 (acting on the on/off button) or if the memory card 180 is full. If not, the method returns to block 410; on the other end, the method ends at block 490.

The preferred embodiment of the present invention described above, with the energy measure function implemented in hardware and the gain factor estimation function implemented in software, is a good trade-off between speed and flexibility.

Likewise considerations apply if the program executes a different equivalent method, for example with error routines, with sequential processes, and the like. In any case, the method of the present invention leads itself to be carried out even with all the functions completely implemented in hardware or in software.

Figure 5:
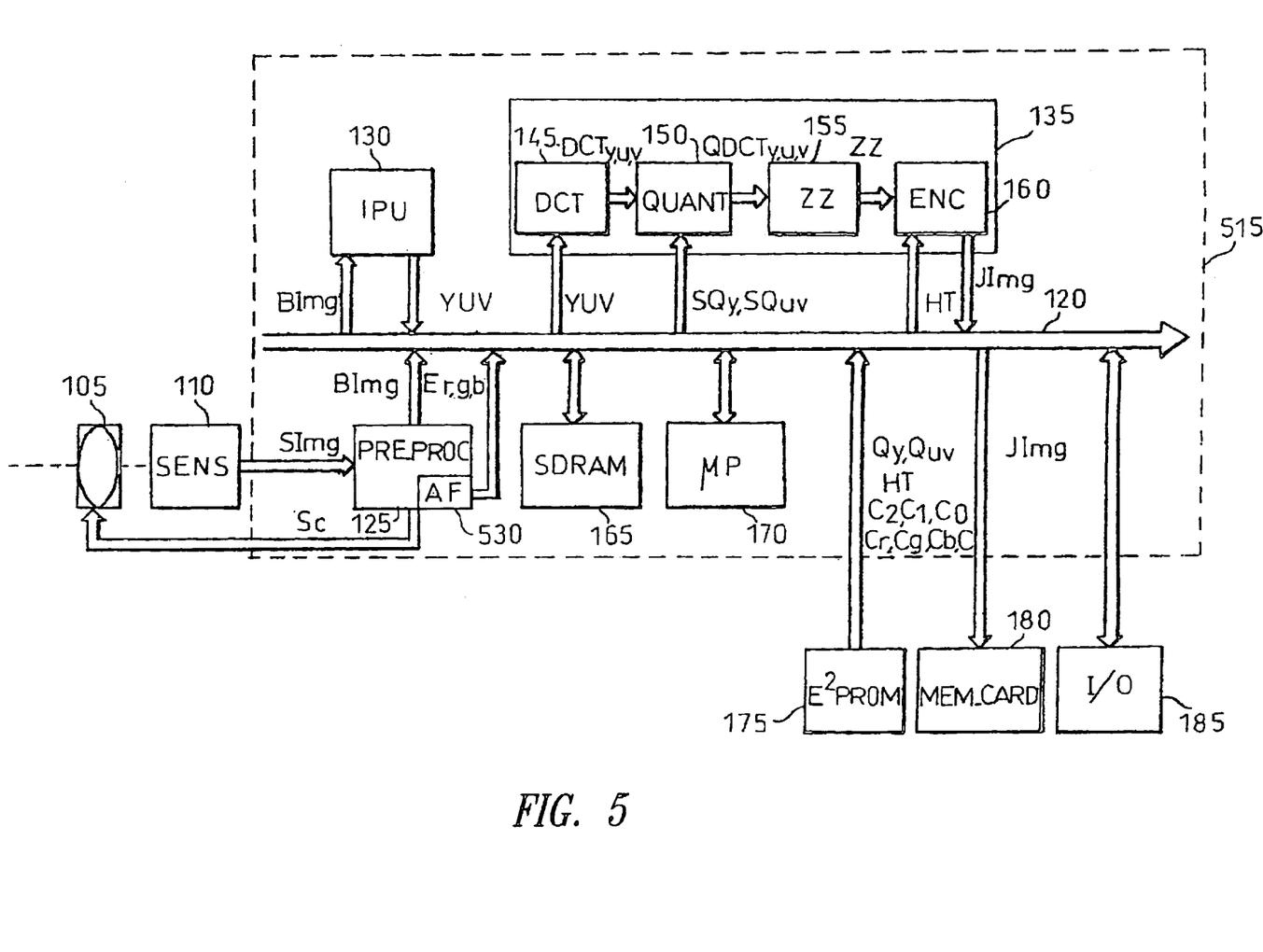
FIG. 5 depicts an alternative embodiment of the camera.

With reference now to FIG. 5 (the elements corresponding to the ones of FIG. 1 are denoted with the same reference numbers and their explanation is omitted for the sake of simplicity) a different embodiment of the present invention is shown. The figure depicts a camera 500 with a control unit 515; the control unit 515 differs from the one described above in that no distinct energy unit is provided; on the other hand, an auto-focus unit 530 of the pre-processing unit 125 supplies the energy measures Er,g,b, which are sent onto the bus 120. The auto-focus unit 530 includes a block similar to the energy unit described above (wherein the energy measures are preferably estimated using Sobel filters). The microprocessor 175 controls the camera 500 running a program similar to the one described above.

This solution is particularly advantageous, in that the gain factor is estimated using values already computed by the auto-focus unit; therefore, this structure is faster and further reduces the power consumption. Moreover, the camera is very simple, since no additional unit is required.

Naturally, in order to satisfy local and specific requirements, a person skilled in the art may apply to the solution described above many modifications and alterations all of which, however, are included within the scope of protection of the invention as defined by the following claims.

We claim:

1. A method of compressing a digital image including a matrix of elements each including a plurality of digital components of different type representing a pixel, the method comprising the steps of:

providing an incomplete digital image wherein at least one component is missing in each element;

obtaining the digital image from the incomplete digital image;

splitting the digital image into a plurality of blocks and calculating, for each block, a group of DCT coefficients for the components of each type;

quantizing the DCT coefficients of each group using a corresponding quantization table scaled by a gain factor for achieving a target compression factor;

determining an energy measure of the incomplete digital image;

estimating the gain factor as a function of the energy measure, the function being determined experimentally according to the target compression factor.

2. The method according to claim 1, wherein the step of estimating the gain factor includes the steps of:

estimating a basic compression factor provided by the quantization tables scaled by a pre-set factor as a first function of the energy measure, estimating the gain factor as a second function of the basic compression factor, the first function and the second function being determined experimentally according to the target compression factor.

3. The method according to claim 2, wherein the first function is a linear function and the second function is a quadratic function.

4. The method according to claim 2, further comprising the steps of:
storing a plurality of sets of parameters representing the second function, each set of parameters being associated with a corresponding value of the target compression factor,
selecting an image quality and determining a current value of the target compression factor as a function of the selected image quality,
reading the parameters associated with the current value of the target compression factor and estimating the gain factor using the read parameters.

5. The method according to claim 2, wherein the pre-set factor is determined experimentally according to the target compression factor.

6. The method according to claim 1, wherein each element of the incomplete digital image consists of a single component chosen between a red component, a green component, and a blue component, the elements of the incomplete digital image being arranged in a Bayer pattern.

7. The method according to claim 6, wherein the red, green, and blue components not chosen are missing components, and each element of the digital image consists of a luminance component, a first chrominance component, and a second chrominance component, the step of obtaining the digital image from the incomplete digital image comprising the steps of:
interpolating the missing components for each element of the incomplete digital image,
calculating the luminance component, the first chrominance component and the second chrominance component for each element of the digital image from the corresponding red component, green component and blue component.

8. The method according to claim 6, wherein the energy measure consists of an energy measure of the green components.

9. The method according to claim 6, wherein the energy measure consists of an energy measure of the red components, an energy measure of the green components and an energy measure of the blue components.

10. The method according to claim 9, wherein the step of determining the energy measure comprises, for each type of component, the steps of:
calculating, for each element of the incomplete digital image consisting of said type of component, a first absolute value of the difference between the element and a first adjacent element consisting of said type of component along a first direction, and a second absolute value of the difference between the element and a second adjacent element consisting of said type of component along a second direction perpendicular to the first direction, and
summing the first absolute values and the second absolute values.

11. The method according to claim 10, wherein a quantization table is asymmetric along the first direction and the second direction, the method further comprising the steps of:
multiplying each first absolute value by a correction factor for compensating the asymmetry of the quantization table.

12. The method according to claim 1, further comprising the step of controlling an automatic focus of the incomplete digital image using the energy measure.

13. A device for compressing a digital image including a matrix of elements each including a plurality of digital components of different type representing a pixel, the device comprising:
means for providing an incomplete digital image wherein at least one component is missing in each element;
means for obtaining the digital image from the incomplete digital image;
means for splitting the digital image into a plurality of blocks and calculating, for each block, a group of DCT coefficients for the components of each type;
means for quantizing the DCT coefficients of each group using a corresponding quantization table scaled by a gain factor for achieving a target compression factor;
means for determining an energy measure of the incomplete digital image; and
means for estimating the gain factor as a function of the energy measure, the function being determined experimentally according to the target compression factor.

14. The device according to claim 13, further comprising:
a pre-processing unit including the means for providing the incomplete digital image;
an image-processing unit comprising the means for obtaining the digital image;
a compression unit comprising the means for splitting the digital image and for calculating the DCT coefficients and the means for quantizing the DCT coefficients;
a memory unit for storing the quantization tables;
an energy unit including the means for determining the energy measure;
a processor unit for controlling the device;
communication means for connecting the pre-processing unit, the image-processing unit, the compression unit, the memory unit, the energy unit and the processor unit therebetween, the processor unit estimating the gain factor under the control of a program stored onto the memory unit.

15. The device according to claim 13, further comprising means for controlling an automatic focus of the incomplete digital image using the energy measure.

16. The device according to claim 15, further comprising:
a pre-processing unit including the means for providing the incomplete digital image;
an image-processing unit comprising the means for obtaining the digital image;
a compression unit comprising the means for splitting the digital image and for calculating the DCT coefficients and the means for quantizing the DCT coefficients;
a memory unit for storing the quantization tables;
an auto-focus unit including the means for determining the energy measure and the means for controlling the automatic focus;
a processor unit for controlling the device; and
communication means for connecting the pre-processing unit, the image-processing unit, the compression unit, the memory unit, the auto-focus unit and the processor unit therebetween, the processor unit estimating the gain factor under the control of a program stored onto the memory unit.

17. A digital still camera comprising the device of claim 13.

* * * * *